United States Patent [19]

Doddington et al.

[11] Patent Number: 4,910,784
[45] Date of Patent: Mar. 20, 1990

[54] LOW COST SPEECH RECOGNITION SYSTEM AND METHOD

[75] Inventors: George R. Doddington; P. K. Rajasekaran, both of Richardson; Michael L. McMahan, Plano; Wallace Anderson, Richardson, all of Tex.

[73] Assignee: Texas Instruments Incorporated, Dallas, Tex.

[21] Appl. No.: 79,563

[22] Filed: Jul. 30, 1987

[51] Int. Cl.4 .................................................. G10L 5/00
[52] U.S. Cl. .................................................. 381/43
[58] Field of Search .................................... 381/42–43

[56] References Cited

U.S. PATENT DOCUMENTS

| 2,575,909 | 11/1951 | Davis | 381/43 |
|---|---|---|---|
| 3,225,141 | 12/1965 | Dersch | 381/43 |
| 3,322,898 | 5/1967 | Kalfaian | 381/43 |
| 3,647,978 | 3/1972 | Hill | 381/43 |
| 3,943,295 | 3/1976 | Martin et al. | 381/43 |
| 4,181,813 | 1/1980 | Marley | 381/43 |
| 4,780,906 | 10/1988 | Rajasekaran et al. | 381/43 |

Primary Examiner—Emanuel S. Kemeny
Attorney, Agent, or Firm—James T. Comfort; Melvin Sharp

[57] ABSTRACT

A low cost speech recognition system generates frames of received speech having binary feature components. The received speech frames are compared with reference templates, and error values representing the difference between the received speech and the reference templates are generated. At the end of an utterance, if one template resulted in a sufficiently small error value, the word represented by that template is selected as the recognized word.

22 Claims, 2 Drawing Sheets

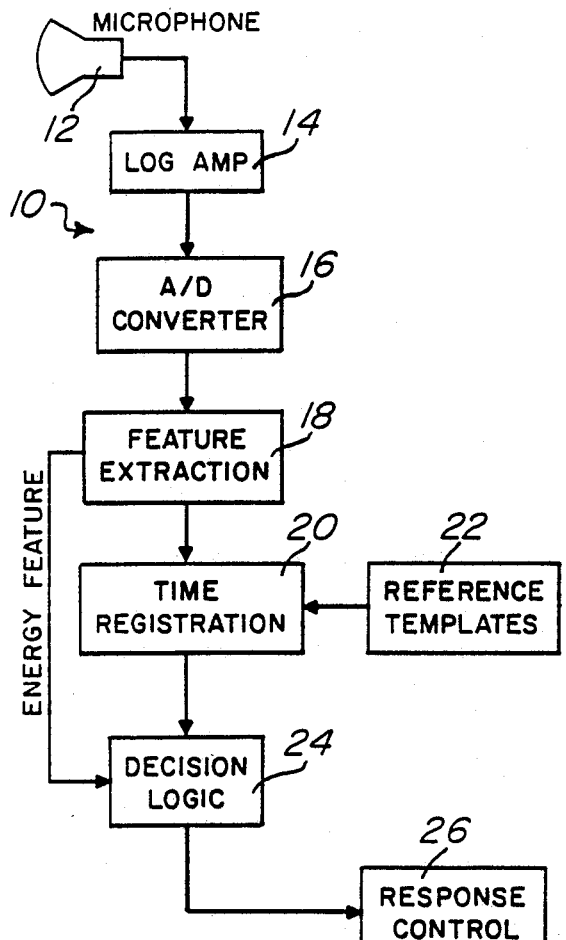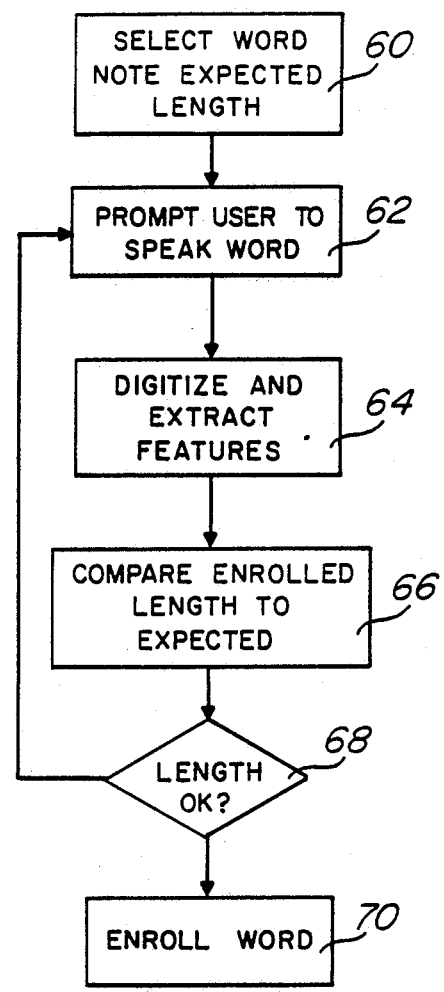
FIG. 1
FIG. 3

4,910,784

LOW COST SPEECH RECOGNITION SYSTEM AND METHOD

BACKGROUND OF THE INVENTION

The present invention relates generally to the recognition of human speech, and more specifically to a system and method for low cost word recognition.

Many techniques have been developed to recognize spoken words. These vary greatly in complexity and capability. Speaker dependent isolated word recognition rates approaching 100% have been reached by some sophisticated systems. These are usually implemented on mainframe or large mini or micro computers, and require specialized hardware and complex software in order to realize real-time recognition.

In many areas, extremely high recognition rates are not necessary. Such is true in some consumer products, especially in games and toys. In these systems, cost minimization is often more important than a small, incremental improvement in recognition rates. Low cost requires systems which use a minimum number of electronic components, which generally limits both available memory and processing power.

Also, in many low cost applications, speaker independent recognition is not required. Single word recognition may be sufficient. Ability to operate in a noisy environment is often needed, as is the ability to recognize single words embedded in a longer utterance.

Present low cost recognition techniques suitable for typical consumer applications usually utilize zero crossing rate techniques and compression/stretch time registration. These techniques generally do not perform adequately for even small vocabularies under good conditions. Present low cost techniques usually do not enroll the references properly, further interfering with their ability to compare received speech with the reference templates defining the vocabulary.

SUMMARY OF THE INVENTION

It would therefore be desirable for a low cost speech recognition method to operate satisfactorily in a system which has extremely limited memory and processing facilities. It would be another desirable feature of a low cost system that vocabulary enrollment be flexible and accurate.

Therefore, in order to realize these and other objects and advantages as will become apparent, a system according to the present invention receives speech and converts it to a collection of weighted features in a series of frames having a preselected length. The various features are each given a binary value which indicates the values thereof relative to preselected thresholds. Each speech frame is therefore represented by a string of bits, with the length of the string equalling the number of features which were extracted from the speech. The thus encoded frames are compared with reference templates to determine the best match.

The novel features which characterize the present invention are defined by the claims. For the purpose of illustrating and explaining the invention, a preferred embodiment is described below with reference to the drawings.

BRIEF DESCRIPTION OF THE DRAWINGS

FIG. 1 is a block diagram of a system for recognizing speech according to the present invention;

FIG. 3 is a flow chart illustrating a preferred enrollment process.

DESCRIPTION OF THE PREFERRED EMBODIMENT

Figure 2:
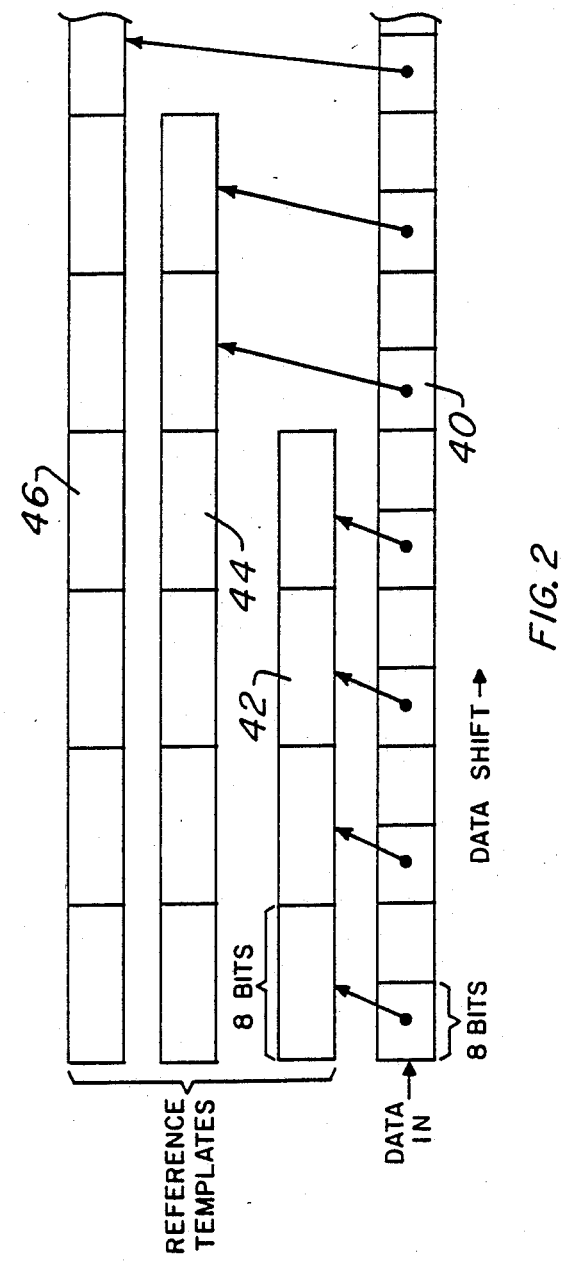
FIG. 2 is a diagram illustrating comparison of incoming speech with reference templates.

FIG. 1 shows a preferred system 10 for recognizing speech according to the present invention. This system has stringent restrictions regarding the amount of memory which is available. Most of the functions which will now be described can be implemented on a single signal processing chip of the TMS 320 series available from Texas Instruments.

Speech is received at a microphone 12 which is coupled to a logarithmic amplifier 14. The logarithmic amplifier 14 is not required in all systems, but is necessary in those which have an A/D converter with limited dynamic range. A converter with a range of more than 14 bits will not generally require the use of a logarithmic amplifier for compression, but an A/D converter used in the preferred embodiment will usually have fewer bits than this in order to lower cost. An alternative version uses an 8 bit CODEC such as is commercially available.

The output of the amplifier 14 is connected to an A/D converter 16. The converter 16 samples the compressed speech waveform at preselected intervals. In the preferred embodiment, speech is sampled at a frequency of 8 KHz. The output of the A/D converter 16 is connected to feature extraction circuitry 18. Feature extraction is preferably done on a TMS 320 series signal processor as described above.

Feature extraction consists of grouping the sampled speech into frames and calculating Linear Predictive Coding (LPC) parameters for each frame. Calculation of LPC parameters requires that the digitized speech be linear, so the digitized samples are decompressed prior to the actual feature extraction. This can be done by indexing a look up table which contains the appropriate logarithmically expanded values for the particular log amplifier 14 which is being used. This is done in a manner well known in the art.

In the preferred embodiment, frames are 20 ms long, and 10th order autocorrelation LPC analysis, with rectangular or other smoothing windows, is used. This results in 10 feature coefficients plus an energy coefficient. The LPC parameters are further transformed into the cepstrum transform of the frame. Preferably, there are 8 cepstral parameters calculated for each frame.

Each cepstral parameter is then compared with a threshold value, and a single bit used to express whether the cepstral coefficient is larger or smaller than the threshold. In the preferred embodiment, a different threshold is used for each component. After this comparison is completed, a frame of speech has been transformed into a single byte of data.

This byte is transferred to a time registration mechanism 20, which compares it with reference templates 22 for the words in the defined vocabulary. This is done in a process similar to convolution/correlation, which is described in detail in connection with FIG. 2.

Referring to FIG. 2, each frame of data, now represented as 8 binary cepstral coefficients, is placed into a queue 40, preferably implemented as a circular buffer having 50 partitions, each one byte wide. Each time a new frame is inserted into the queue 40, all frames already in the queue are shifted one position to the right.

Since each frame represents 20 ms of speech, the previous one second of speech is contained in the queue 40 in encoded form.

Reference templates 42, 44, and 46 contain binary cepstral coefficients representing the words in the vacabulary to be recognized. Only 3 templates are shown, but a larger number are preferably used. In the preferred embodiment, the vocabulary can have up to 16 reference words. The reference words are stored with a 40 ms frame length, although each frame is still represented in 8 bits. This allows the reference templates to be stored more efficiently. The term "word" as used in connection with the reference templates usually refers to a word of spoken language. However, it may actually means a partial word or a phrase of actual language. As used herein, a word is some unit of speech which is to be recognized.

Comparison of the received speech data and the templates is done by assuming that the just received frame is the last frame of a word to be recognized. Since the data frames are only one-half as long as the reference templates, only alternate frames in the queue 40 are compared with the reference templates 42, 44, and 46. This is illustrated by the arrows pointing from alternating data frames to their corresponding reference frames. Reference templates may vary in length, and only the most recent number of data frames corresponding to the length of each reference template is used to compare that template to the data.

Each frame of every reference template 42 is exclusive ORed (XOR) with the corresponding data frame, giving a difference measurement which is the Hamming distance between the frames. The differences for each frame are averaged to give an error value for template 42. Error values for frames and words are expressed as a number of differing bits up to 8. The same procedure is repeated with reference templates 44 and 46.

Long words tend to give higher average error values than short words. Also, it is desirable to give preference to a good match for a long reference template over a slightly better match for a short template. An example of this is the word FORTUNE, when FORTUNE and FOUR are both words in the vocabulary. The spoken word FORTUNE might give a slightly better match with the reference template for FOUR, but the longer word should be preferred if it has nearly as good a match.

In order to give preference to longer matches, the average frame error for each reference word is multiplied by a factor which is inversely proportional to its length. Thus, longer reference words have their average frame error decreased by a greater degree than shorter words. The multiplication factor is preferably given by the equation $$e-0.05*\text{number-of-frames}$$

where number-of-frames is the number of frames in the reference template. This equation can be approximated by a linear equation, or a look up table containing the values for all allowable reference frame lengths can be kept if there is enough memory available.

The above equation is applied to the average frame error calculated for all reference templates. Only the best 2 matches are kept. The best 2 matches are kept for the entire duration of an utterance, with the modified average frame error for each reference template being compared to the current best 2 matches. If the modified average frame error for a template is less than the previous second best match, it and the previous best match are retained in the appropriate order as the current best 2 matches. Retention of the best 2 matches requires keeping only the identification of the words and their associated error values.

Once all of the templates have been compared to the current queue, the time registration mechanism 20 waits for the next data frame to arrive, at which time the comparison procedure just described in repeated.

Returning to FIG. 1, the time registration mechanism 20 transfers the current 2 best word matches to decision logic 24 after the calculations have been completed for each frame of speech. The decision logic 24 combines this information with energy information for the current utterance to determine when a word has been recognized.

Any relative energy detection method may be used to determine the start and end of an utterance. The preferable method is to use an adaptive dual threshold detection method such as described in U.S. patent application Ser. No. 541,410 filed Oct. 13, 1983, now U.S. Pat. No. 4,696,040 issued Sept. 22, 1987. The decision logic 24 determines that an utterance has begun when the energy level calculated by the feature extractor 18 rises above a threshold, and that an utterance is complete when the energy level falls below a second threshold. The 2 best matches received from the time registration mechanism 20 are retained and updated for the duration of the entire utterance. Only when a drop in speech energy levels indicates that an utterance is complete does the decision logic 24 make a determination as to the best match.

The match having the lowest error will be accepted only if it is less than a threshold value which is determined in advance to provide acceptable recognition rates. This threshold varies considerably depending on the nature of the application. If no match was made which is sufficiently close to any of the templates, the utterance will be rejected. Also, a check is made of the error value of the second lowest selection. If the second best match is very close to the first, the decision logic 24 rejects the utterance without choosing between the confusingly similar words. This only happens, of course, if the best two matches are with different words from the vocabulary; two matches with the same reference word results in an acceptance of that word.

Since a single recognition is made during an utterance, defined generally as a period of relatively high acoustic energy between two periods of relatively low acoustic energy, only one word can be recognized out of a continuously spoken sentence or phrase. If more than one vocabulary word is included in the utterance, either the one having the best match will be accepted and recognized, or the entire utterance will be rejected as described above. Although only one word can be recognized per utterance, an utterance can contain other words without impairing the ability of the recognizer to accept a word in its vocabulary. Since a comparison is made every time a data frame is placed in the queue 40, words are recognizable even when embedded in a long utterance, and isolated pronunciation is not required.

Recognition of a word, or rejection of the utterance, by the decision logic, completes the speech recognition process. The decision logic 24 generates an output which is appropriate for the application in which it is embedded, and remaining portions of the system can act on the recognized word in ways well known in the art. For example, the system just described can be used in conjunction with a talking doll, which responds to words spoken to it. In this application, the output from the decision logic 24 is coupled to a response control 26, which determines the appropriate response to receipt of various words in the vocabulary. These appropriate responses can include synthesis of speech, or movement of the dolls' arms and legs. Other applications will become apparent to those skilled in the art.

The system 10 described above is preferably used as a speaker dependent recognizer. Speaker dependent recognition requires enrollment of the words in the vocabulary by the speaker to be recognized. A preferred method for enrolling speakers in conjunction with the speech recognition system 10 will now be described in conjunction with FIG. 3.

The flowchart of FIG. 3 shows the steps necessary to enroll one word in the vocabulary. Enrollment of several words is accomplished by repeating this procedure as needed. The words to be enrolled are entirely application specific. The number of words which can be enrolled depends on the available memory and processing power, and on the number of binary features used. The preferred system uses 8 features to define a frame, giving a practical upper bound on the vocabulary of a few dozen words in order that they be uniquely distinguishable. The preferred system enrolls a vocabulary of 16 words. This allows a two-byte (16 bit) word to represent all of the words in a vocabulary on a one bit per word basis.

The first step (60) is to select the word to be enrolled. This is done in any conventional manner as appropriate to the application. Each word which is to be enrolled has an expected length in frames of speech, with each frame having a length of 20 ms. The next step (62) is to prompt the user to speak the selected word. This may also be done in any appropriate manner. Prompting can be done visually or by generating or replaying a stored version of the word to be enrolled.

Enrollment is made of single words spoken in isolation. The beginning and end of the word is identified by the value of the energy feature extracted by the feature extraction mechanism 18. A rise in energy above a silence threshold indicates the start of an utterance, and a drop in the energy level below an active threshold indicates the end of the utterance.

Incoming speech is digitized and transformed into cepstral components as described above. (step 64) Incoming data frames are not compared with the reference templates, they are merely placed into the queue. The decision logic 24 determines the start and end of the utterance. The duration of the utterance in frames of speech is compared with the expected length. (step 66) If the actual length of the utterance is equal to the expected length (step 68), the received data frames for the word are entered as the new reference template. (step 70)

It is not necessary that the length of the enrolled word be exactly as expected for a successful enrollment. Some variation can be tolerated in most applications. In the preferred embodiment, enrollment of words having a length less than the expected length by up to 4 frames is considered acceptable. When a shorter word is enrolled, the silence at the end is not included in the reference template, so that the template itself is shorter than was originally expected. If the enrolled word is longer than expected, only the best frames equal to the expected number are retained. This means that one or more frames at the beginning or end of the word are dropped. The end frames having the least acoustic energy can be dropped. Alternatively, the frame having the greatest acoustic energy can be identified, with frames before and after that point being retained. This could result in a slightly different set of frames being retained. If the enrolled word is longer than expected by more than a small number of frames, typically about 10%, then enrollment is preferably rejected.

In a preferred embodiment, a single enrollment of reference templates is performed. Alternatively, the word to be enrolled can be spoken several times, preferably an odd number, and the features averaged to provide a composite template. This averaging process can be a simple majority count of one's and zero's for each feature. Templates can be updated periodically if desired to better changing user speech patterns. It is also possible to obtain a certain measure of speaker independence by generating templates which are a composite of enrolling multiple speakers. This is difficult in the system described above, however, because much information is lost in the compression to binary coefficients. A large number of speakers can be used to generate the templates, with the reference template for each word being generated by a majority vote for each feature among all of the samples for that word.

In order to improve the accuracy of the templates, whether single or multiple enrollment is used, it is possible to use a weighting vector mask with each template. This indicates whether a given coefficient is even to be used in the comparison process; some coefficients are simply ignored. This mask can indicate that certain coefficients are to be ignored throughout the template, or each frame of the template can be considered separately. The effect of ignoring a coefficient in a template is that no error is generated when comparing that bit regardless of the value of the data frame. This can be of use when speaker independent templates are used, since some features may not have a bare majority, and be of less significance.

Numerous modifications to the system as described above will become apparent to those skilled in the art. For example, it is possible to derive the cepstral coefficients of each frame directly, instead of performing the LPC transform first. Other transforms than the cepstrum can be used. For example, the LPC parameters could be made binary valued directly, although experimentation has indicated that the second transform into cepstral parameters yields better recognition in most instances. Also, principal spectral components can be used to generate a principle feature vector as known in the art, with this vector given binary values in the manner described. Also, the order of the transform can be changed from 8, although using 8 bits greatly simplifies calculations and requires a minimum of memory on a byte-oriented computer.

TECHNICAL ADVANTAGES

The described system allows a very low cost speech recognizer to be constructed. Storage of reference templates and transformed speech data is minimized by representing all speech frames with binary coefficients. Comparison of speech with templates using XOR allows fast operation on present day microprocessors. This comparison scheme also allows individual words to be recognized out of extended continuous utterances.

An accurate enrollment can be easily implemented using the same hardware as is used for recognition. Accurate enrollment greatly improves the recognition rate of the system. Experimental systems constructed using a TMS 320C17 from Texas Instruments have achieved recognition rates in excess of 80% under very adverse conditions, such as noise and altered speech patterns due to stress. This is accomplished in a system having only 256 16-bit words for data storage, which includes storage of all templates as well as the incoming data queue.

Such a system utilizes a 50 frame queue for storage of speech data, giving a maximum recognizable word length of 1 second. The vocabulary consists of 16 words, and has 200 words of reference template storage. Since each template consists of one byte (one-half word) and represents 40 ms of speech, up to 20 seconds of reference speech can be stored in the templates. Incoming words have a lower limit of 4 frames to be recognized.

The present invention has been illustrated by the system described above, and it will become apparent to those skilled in the art that various modifications may be made thereto. Such variations fall within the spirit of the present invention, the scope of which is defined by the claims.

What is claimed is:

1. A system for recognizing speech, comprising:
a digitizer for sampling analog speech signals at predetermined intervals and generating a digital representation thereof as digital speech signals;
a feature extractor coupled to said digitizer for grouping the digital speech signals into frames and generating a transform of the digital speech signals as grouped in each frame, wherein the transform has a plurality of feature coefficients, and wherein each feature coefficient has a corresponding binary feature coefficient indicating whether the feature coefficient has a value greater or less than a preselected threshold for that feature coefficient;
a queue coupled to said feature extractor for receiving frames of binary feature coefficients as speech frames and arranging them in consecutive order;
a comparator coupled to said queue for comparing a plurality of speech frames with a plurality of reference templates having frames of binary feature coefficients and generating a plurality of error values indicating the closeness of the match therebetween, wherein the reference templates are respectively representative of different words; and
a decision controller coupled to said comparator for receiving the results of the comparisons, and for selecting a best match between a portion of a speech utterance as represented by said speech frames and the reference templates.

2. The system of claim 1, wherein said decision controller further includes means for detecting the beginning and end of an utterance as defined by its acounstic energy levels, and wherein said decision controller selects a best match only after an utterance is completed.

3. The system of claim 2, wherein said decision controller selects a best match only if at least one comparison in said queue has an error less than a predetermined threshold, and wherein an utterance is rejected otherwise.

4. The system of claim 3, wherein an utterance is rejected if the two comparisons having the lowest errors have error values which are within a preselected range of each other.

5. The system of claim 1, wherein said comparator computes an exclusive-OR between each frame of each reference template and a corresponding speech frame of binary feature coefficients in said queue, and wherein the error value indicates the number of bits which do not match between respective reference templates and the corresponding speech frame of binary feature coefficients.

6. The system of claim 1, wherein only alternate speech frames of binary feature coefficients in said queue are used by said comparator for each comparison step with the plurality of reference templates.

7. A method for recognizing spoken words, comprising the steps of:
(a) digitizing an analog speech signal representing an utterance of speech by sampling the analog speech signal at preselected intervals to generate digital speech signals;
grouping the digital speech signals into frames and transforming each frame of digital speech signals into a speech frame comprising a plurality of binary coefficients indicating acoustic features;
providing a plurality of reference templates respectively representative of different words, each reference template having a plurality of frames of binary coefficients;
comparing respective speech frames of binary coefficients with the reference templates, and generating error values indicating the magnitude of the differences therebetween; and
selecting a reference template which generates the lowest error value as the recognized word.

8. The method of claim 7, wherein a reference template is selected as the recognized word only if its error value is less than a predetermined value.

9. The method of claim 7, wherein the reference template frames have a time duration twice as long as the speech frames of binary coefficients but are represented by the same number of binary coefficients, wherein only alternate ones of consecutive speech frames of binary coefficients are compared with the reference templates in the generation of said error values.

10. The method of claim 7, wherein the comparison of speech frames of binary coefficients with the reference templates comprises performing an exclusive OR between corresponding speech and reference template frames, whereby the generated error values are the Hamming distance between the corresponding speech and reference template frames.

11. A method for enrolling speech for use with a speech recognition system, comprising the steps of:
selecting a word to be enrolled and determining an expected length in speech frames necessary for the representation thereof;
receiving an utterance of the selected word in the form of an analog speech signal;
digitizing the analog speech signal representative of the utterance by collecting samples thereof at preselected intervals as digital speech signals;
grouping the digital speech signals into frames having a predetermined time duration;
extracting binary features for each frame of digital speech signals to form respective speech frames of binary features corresponding to each of the frames of digital speech signals;

comparing the length of the utterance as represented by speech frames of binary features to the expected length; and if the utterance as represented by speech frames of binary features has a length in speech frames within a preselected amount of the expected length, enrolling the speech frames representing the utterance as a reference template.

12. The method of claim 11, wherein the reception of an utterance of the selected word in the form of an analog speech signal and the digitizing of the analog speech signal are performed a plurality of times, and wherein the extraction of binary features with respect to each set of digital speech signals resulting therefrom is used to create a composite set of binary feature frames.

13. The method of claim 12, wherein the plurality of utterances as received in the form of analog speech signals are made by a single speaker.

14. The method of claim 12, wherein the plurality of utterances as received in the form of analog speech signals are made by different speakers.

15. The method of claim 7, wherein the transforming of each frame of digital speech signals into a speech frame comprising a plurality of binary coefficients comprises initially transforming each frame of digital speech signals into a plurality of speech parameters defining respective feature coefficients;

comparing each of the plurality of speech parameters included in a respective speech frame with a preselected threshold value;

assigning a first or a second value as a binary coefficient corresponding to the respective speech parameter depending upon whether the speech parameter is greater or less than the preselected threshold value corresponding thereto; and assembling a plurality of said binary coefficients obtained from respective comparisons of all of the speech parameters included in a speech frame with preselected threshold values as a string of said binary coefficients representing a speech frame.

16. The method of claim 15, wherein the first and second values assignable as a binary coefficient are respectively "1" and "0".

17. The method of claim 16, wherein each string of binary coefficients representing a speech frame is of eight data bits in length.

18. A method for recognizing spoken words, comprising the steps of:

digitizing an analog speech signal representing an utterance of speech by sampling the analog speech signal at preselected intervals to generate digital speech data;

grouping the samples of digital speech data into frames having a plurality of samples of digital speech data;

transforming the frames of digital speech data into a cepstrum transform having a plurality of cepstral parameters for each frame which define respective feature coefficients;

comparing each cepstral parameter with a preselected threshold value;

assigning a first or a second value to a binary feature coefficient depending upon whether the cepstral parameter is greater or less than the preselected threshold value corresponding thereto;

assembling a plurality of said binary feature coefficients obtained from respective comparisons of all of the cepstral parameters included in a frame with preselected threshold values as a string of said binary feature coefficients representing a frame of speech data;

providing a plurality of reference templates respectively representative of different words, each reference template having a plurality of frames of binary feature coefficients;

comparing speech frames of binary feature coefficients with the reference templates, and generating error values indicating the magnitude of the differences therebetween; and selecting a reference template which generates the lowest error value as the recognized word.

19. The method of claim 18, further including analyzing each frame of digital speech data to determine linear predictive coding speech parameters for each frame; and thereafter transforming the linear predictive coding speech parameters for each frame into a cepstrum transform having a plurality of cepstral parameters for each frame which define the respective feature coefficients.

20. A method for recognizing spoken words, comprising the steps of:

digitizing an analog speech signal representing an utterance of speech by sampling the analog speech signal at preselected intervals to generate digital speech data;

grouping the samples of digital speech data into frames having a plurality of samples of digital speech data;

transforming each frame of digital speech data into a plurality of speech parameters defining respective feature coefficients;

comparing each of the plurality of speech parameters included in a respective speech frame with a preselected threshold value;

assigning a first or a second value as a binary coefficient corresponding to the respective speech parameter depending upon whether the speech parameter is greater or less than the preselected threshold value corresponding thereto;

assembling a plurality of said binary coefficients obtained from respective comparisons of all of the speech parameters included in a speech frame with preselected threshold values as a string of said binary coefficients representing a speech frame;

arranging a plurality of speech frames, each comprising a plurality of binary coefficients, in consecutive order in a queue;

providing a plurality of reference templates respectively representative of different words, each reference template having a plurality of frames of binary coefficients, wherein the reference template frames have a time duration twice as long as the speech frames of binary coefficients but are represented by the same number of binary coefficients;

comparing alternate ones of the consecutive speech frames of binary coefficients as arranged in the queue with the reference templates, and generating error values indicating the magnitude of the differences therebetween; and selecting a reference template which generates the lowest error value as the recognized word.

21. The method as set forth in claim 20, further including shifting all speech frames already arranged in the queue one position within the queue in response to the insertion of a new speech frame into the queue during the filling of the queue to maintain the plurality of speech frames as arranged therein in consecutive order.

22. The method of claim 21, wherein the comparing of alternate ones of the consecutive speech frames of binary coefficients as arranged in the queue with the reference templates continues until all of the reference templates have been compared to the alternate speech frames of the queue;

thereafter arranging a subsequent plurality of speech frames in consecutive order in a succeeding queue; and comparing alternate ones of the consecutive speech frames in the succeeding queue with the reference templates in the generation of said error values.

* * * * *